United States Patent [19]

Zenz

[11] 4,067,704

[45] Jan. 10, 1978

[54] GRANULAR BED FILTER

[75] Inventor: Frederick A. Zenz, Garrison, N.Y.

[73] Assignee: The Ducon Company, Inc., Mineola, N.Y.

[21] Appl. No.: 733,650

[22] Filed: Oct. 18, 1976

[51] Int. Cl.[2] .............................................. B01D 46/04
[52] U.S. Cl. ............................................ 55/96; 55/99; 55/282; 55/302; 55/484
[58] Field of Search ...................... 55/96, 98, 99, 302, 55/282, 484

[56] References Cited

U.S. PATENT DOCUMENTS

| 3,410,055 | 11/1968 | Zenz | 55/96 |
| 3,798,882 | 3/1974 | Kalen | 55/302 |
| 3,912,466 | 10/1975 | Zenz | 55/96 |

Primary Examiner—Bernard Nozick
Attorney, Agent, or Firm—Seidel, Gonda & Goldhammer

[57] ABSTRACT

The filter apparatus includes a plurality of hollow filter chambers each including a filter bed whose volume greatly exceeds the volume of the granular filter material such as sand. The beds are backwashed by a steady flow of low pressure air sufficient to fluidize the beds.

10 Claims, 2 Drawing Figures

GRANULAR BED FILTER

BACKGROUND

This invention is an improvement over the apparatus and method disclosed in U.S. Pat. No. 3,798,882. Commercial embodiments of the apparatus disclosed in said patent fail to attain the expected efficiency. Extensive effort to adjust and/or modify the apparatus disclosed in said patent was unproductive. The only manner in which it was possible to ascertain why the apparatus in said patent was not attaining the expected efficiency was by constructing the entire apparatus from transparent polymeric plastic material and observation of the filter bed during filtering and backwash.

The observation referred to above revealed two significant features which contributed to the lack of attaining the expected efficiencies. First, it was ascertained that fluidization of the beds during backwashing could not be accomplished by pulsed jets. As disclosed in said patent, backwashing involves high pressure indicated as preferably between 150 and 200 psi accomplished by two jets or pulses of air timed so as to occur approximately 0.10 to 0.15 seconds delay. It has now been ascertained that the use of pulses causes the bed to rise like a piston and descend like a piston thereby blocking flow through the screen and failing to attain the fluidized state.

A second significant point which contributed to the failure to attain the fluidized state was the ratio of the size of the filter chamber in each stack as compared with the height of the filter bed. As stated in said U.S. Pat. No. 3,798,882, approximately 25% of the space in the filter chambers above the filter beds is unoccupied so that the bed may be fluidized into that space. I have now ascertained that an unoccupied space of 25% is significantly inadequate. I have found that the unoccupied space above the filter bed must be at least 60% of the chamber volume and may be as high as 90%.

Other changes in the apparatus of the present invention as compared with the apparatus in said patent include minimizing pressure drop during filtration. As a result of the above-mentioned changes and other changes to be described in greater detail hereinafter, the apparatus of the present invention now attains the anticipated efficiencies that were not heretofore attained by the apparatus in said U.S. Pat. No. 3,798,882.

SUMMARY OF THE INVENTION

The granular filter bed apparatus includes a housing having an inlet chamber and an outlet chamber with means defining a wall separating said chambers. A dirty gas inlet communicates with the inlet chamber and a clean gas outlet communicates with the outlet chamber.

The housing is provided with a plurality of filter chambers as a part of the separating wall. Each filter chamber communicates at its upper end with the inlet chamber and at its lower end with the outlet chamber. A filter bed of granular material is provided in each filter chamber of such a height so that the unoccupied space above the filter bed in each filter chamber is between 10 and 40% of the height thereof.

A means is provided to backwash the filter bed by fluidizing the granular material into the space above each bed. Backwashing is accomplished by introducing air at a uniform rate and pressure into the outlet chamber for a predetermined period of time.

It is an object of the present invention to provide a highly efficient granular bed filter.

It is another object of the present invention to provide an efficient granular bed filter apparatus and method which is adapted for use with high temperatures and dirty gases containing fine particles which are to be removed therefrom.

Other objects will appear hereinafter.

For the purpose of illustrating the invention, there is shown in the drawings a form which is presently preferred; it being understood, however, that this invention is not limited to the precise arrangements and instrumentalities shown.

Figures 1, 2:
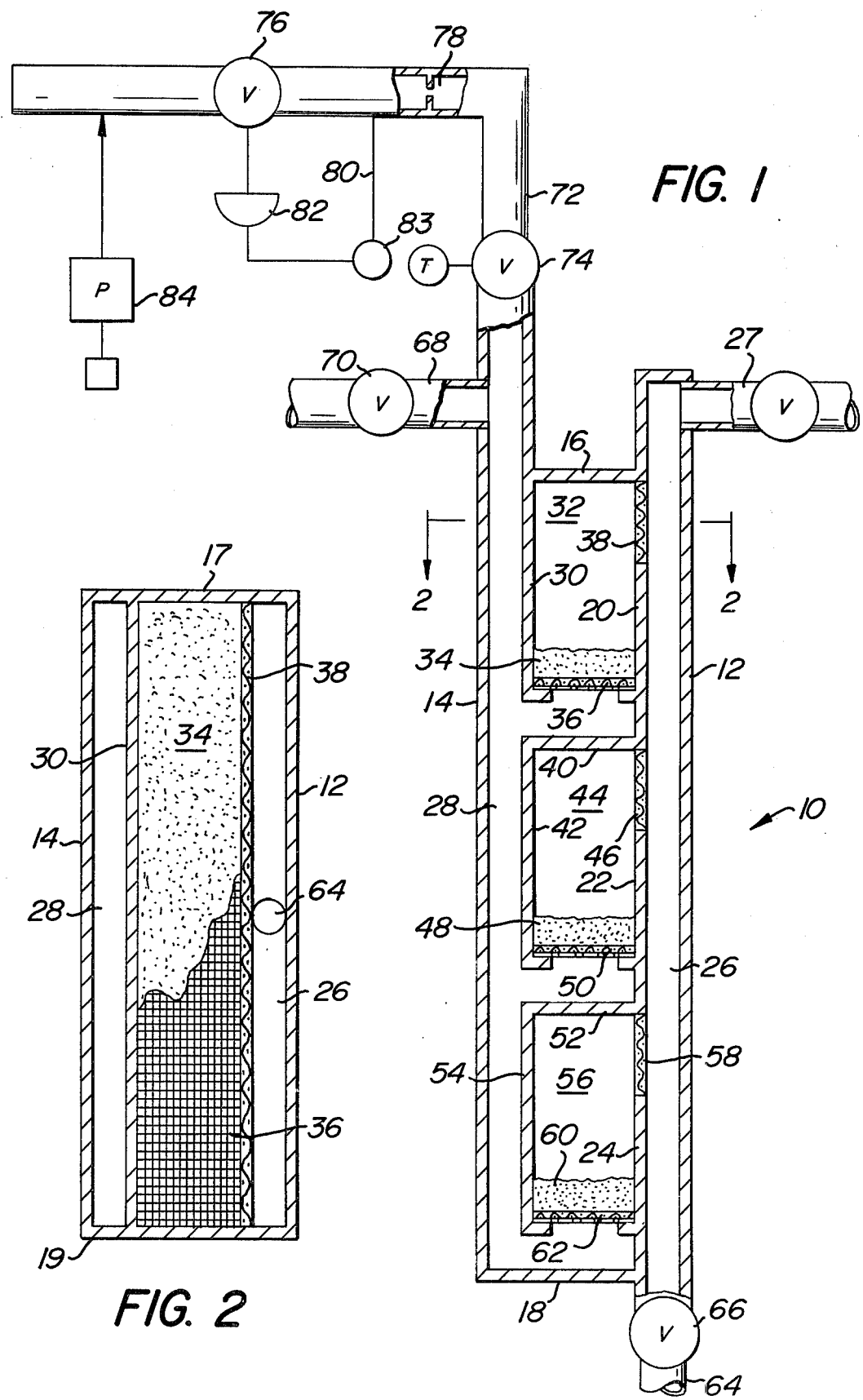
FIG. 1 is a vertical sectional view of apparatus in accordance with the present invention.
FIG. 2 is a sectional view taken along the like 2—2 in FIG. 1.

Referring to the drawing in detail, wherein like numerals indicate like elements, there is shown in FIG. 1 apparatus in accordance with the present invention designated generally as 10. The apparatus 10 may be circular and/or annular as disclosed in the above-mentioned patent. For purposes of illustration, the apparatus 10 is rectangular in configuration.

The apparatus 10 includes a rectangular front wall 12 and a rectangular rear wall 14 interconnected at their upper end by a top wall 16 and interconnected at their lower end by a bottom wall 18. Said walls are also interconnected at their ends by side walls 17 and 19 thereby defining a rectangular housing.

A plurality of filter chambers are provided within the housing. A plurality of partition walls 20, 22 and 24 are aligned and disposed parallel to the front wall 12 thereby defining therebetween a manifold inlet chamber 26. Dirty gas is introduced into the inlet chamber 26 by way of a valved inlet conduit 27.

The housing is provided with a manifold outlet chamber 28. The outlet chamber 28 is defined on one side by the rear wall 14 and on the other side by wall panels 30, 42 and 54 which are aligned with one another. The panel 30 is parallel to and cooperates with the walls 16 and 20 to define a filter chamber 32 of uniform width containing a filter bed of granular material 34 supported from below by a screen 36. The screen 36 is conveniently supported by flanges on panel 30 and wall 20. An inlet screen 38, when provided, overlies an inlet opening at the upper end of wall 20 adjacent the upper end of the chamber 32. Thus, chamber 32 communicates with the inlet chamber 26 by way of screen 38 and communicates with the outlet chamber 28 by way of screen 36.

Wall 20 is provided with an integral panel 40 connected to the upper end of the panel 42. Wall 22 and panels 40, 42 cooperate to define a second filter chamber 44 below and aligned with the filter chamber 32. Chamber 44 is provided with an inlet screen 46 adjacent its upper end to provide communication with the inlet chamber 26. Chamber 44 contains a filter bed of granular material 48 supported by a screen 50. Screen 50 is supported by flanges on panel 42 and wall 22. Chamber 44 communicates with the outlet chamber 28 by way of the screen 50.

A panel 52 which is integral with wall 22 interconnects with the panel 54. Panels 52, 54 cooperate with the wall 24 to define a third filter chamber 56. Filter chamber 56 is below and aligned with the filter chambers 32, 44.

A screen 58 adjacent the upper end of chamber 56 provides communication between said chamber 56 and the inlet chamber 26. A filter bed of granular material 60 is provided within the chamber 56 and supported by the screen 62. Screen 62 is supported by the flanges on wall 24 and panel 54. Chamber 56 communicates with the outlet chamber 28 by way of screen 62.

An outlet conduit 64 communicates with the lower end of the inlet chamber 26. Conduit 64 is provided with a valve 66. The floor of chamber 26 may be sloped toward the conduit 64. Accumulated debris within chamber 26 is withdrawn by way of conduit 64.

A clean gas outlet conduit 68 communicates with the outlet chamber 28. Conduit 68 is provided with a valve 70. A backwash conduit 72 communicates with the outlet chamber 28. Conduit 72 is provided with spaced valves 74, 76 with a fixed orifice 78 therebetween. An adjustable timer 75 controls valve 74.

The valve 74 is preferably a quick opening solenoid valve. Valve 76 is preferably a pressure regulating valve for maintaining a constant outlet pressure. Thus, the diaphragm 82 on the valve 76 communicates with conduit 72 downstream from valve 76 by way of conduit 80. Conduit 80 may be provided with a pressure indicator 83. Air under pressure is supplied to conduit 72, upstream from valve 76, by any suitable pump or compressor having an inlet filter.

As shown in FIG. 1, the height of the bed of granular material in each of the filter chambers 32, 44 and 56 is substantially less than the height of the chambers. The ratio of the height of the filter beds versus the height of their respective chambers is preferably in the range of 10 to 40%. The optimum height for the filter bed is preferably 20–25% of the height of the filter chambers. I have found that within these parameters, the filter beds will not flow like a piston during backwash and plug up the inlet screens 38, 46 and 58. Instead, the filter beds will be fluidized into the space thereabove.

I have found that the dusty side of the screens 38, 46 and 58, when present, requires a minimum open area not only to keep the pressure drop during filtration to a minimum, but also to provide sufficient venting of backwash air so that any granular material reaching the elevation of the screen upon initiation of backwash flow cannot be held against the screen by the velocity of the backwash gas. I have found that screens 38, 46 and 58, when present, should have an open area of 33% and should be large enough to overlie an outlet opening of at least 30 square inches per square foot of bed surface of their respective filter beds.

I have found that in order to distribute the backwash air uniformly over the entire cross sectional area of each filter bed, and also in equal quantities to each of the filter beds being backwashed in parallel simultaneously, the filter bed supporting screen should offer some minimum resistance to backwash air. In other words, the screens 36, 50 and 62 should not exceed a predetermined maximum open area. For the quantity and pressure of backwashed air employed in connection with this invention and to be referred to hereinafter, I have found that the screens 36, 50 and 62 offer sufficient resistance when they have an open area of 33% and are supported from below by a metal reinforcing plate having 290 holes ¼ inch in diameter per square foot of plate area. Each reinforcing plate supports one of the screens 36, 50, 62 which in turn support the filter beds of granular material 34, 48, 60, respectively.

The backwash air must be passed through the beds of granular material in a fluidizing mode in sufficient quantity to remove the collected particulate. At any given superficial velocity through a fluidized bed, there is a maximum quantity of particulate, dependent upon its size and density, which the air can carry and there is a maximum amount of particulate which the filter beds can render into the gas stream. The latter obviously depends upon the concentration of the entrainable particulates residing at any instant of time within the fluidized bed. It is these competing mechanisms of ability to remove the inherent concentrations which establishes the equilibrium concentration of particulates such as dust within the filter beds.

The limits of practicality in terms of pressure drop through the filter beds during the filtering cycle and the volume of compressed backwash air require that the backwash air flow at a rate so that 2 to 4 cubic feet of air per second per square foot of filter bed surface area is present for a time period of about 8 to 10 seconds which period is attained by adjustable timer 75.

The backwash air must be initiated instantaneously and persist at a constant rate. Therefore, I have found that it is highly desirable for the backwash air to flow through the orifice 78 before entering the chamber 28. It is important to note that as opposed to the practice set forth in the above-mentioned patent wherein backwash air was preferably at a pressure up to 200 psi, I have found that the source of backwash air may be as low as 40 psi. The granular filter material is preferably an inert material such as sand and may be that conventionally used heretofore. Other granular material may be used such as granular charcoal for removal of gaseous contaminants such as sulfur dioxide by adsorption. While only three filter chambers 32, 44 and 56 are illustrated, a greater or less number may be utilized. The apparatus 10 is operable over a wide range of temperatures. The inlet conduit 27 need not be connected to a source of dirty gas but may be connected to any source of gas containing particulate matter down to the submicron range which is to be removed from the gas. Likewise, backwashing may be accomplished by use of any gas as well as air.

During a filtering operation, valves 66, 74 and 76 are closed and the valves in conduits 27 and 68 are open. During backwashing, the valves in conduits 27, 68 are closed and valves 66, 74 and 76 are open. Except as noted herein, the operation of the apparatus 10 is as set forth in the above-mentioned patent.

Under certain conditions, inlet screens 38, 46 and 58 are not required. Thus, these inlet screens can be eliminated when the chamber is sufficiently high so that the elevation at which the filter beds are located when fluidized by backwash gas is completely below the elevation of the lower edge of the inlet opening. p the present invention may be embodied in other specific forms without departing from the spirit or essential attributes thereof and, accordingly, reference should be made to the appended claims, rather than to the foregoing specification as indicating the scope of the invention.

I claim:

1. A granular bed filter apparatus comprising a housing having an inlet and an outlet, at least one filter chamber in said housing, an inlet opening adjacent the upper end of said chamber, said chamber communicating with said inlet by way of said opening, a screen adjacent the lower end of said chamber, said chamber communicating with said outlet by way of said screen, a filter bed of granular material in said chamber above the elevation of said screen, the height of said bed being between 10 and 40% of the height of said chamber with the space above the filter bed being unoccupied so that the bed may be fluidized into that space, and valved conduit means communicating with said outlet and including flow orifice means for fluidizing said granular material into said space by introducing fluidizing air at a uniform pressure.

2. Apparatus in accordance with claim 1 wherein for every square foot of surface of the filter bed the opening has a size of about 30 square inches and the fluidizing air quantity is between 2 and 4 cubic feet per second.

3. Apparatus in accordance with claim 1 wherein said valved conduit means includes a conduit having the flow orifice means located between first and second valves in said conduit.

4. Apparatus comprising a housing having an inlet chamber and an outlet chamber, said housing having a wall means separating said chambers, said housing having a dirty gas inlet communicating with the inlet chamber and a clean gas outlet communicating with the outlet chamber, a plurality of filter chambers disposed one above the other in said outlet chamber, an inlet for each chamber, each inlet being adjacent the upper end of its filter chamber and providing communication with the inlet chamber, an outlet screen for each filter chamber adjacent the lower end of each filter chamber for providing communication with the outlet chamber, a filter bed of granular material having a height of between 1 and 3 inches in each filter chamber adjacent the lower end thereof, at least 60% of the filter chambers above their filter beds being unoccupied so as to provide a space into which the granular material may be fluidized, valved conduit means for fluidizing the granular material into the space above each filter bed including flow orifice means for introducing air at a uniform pressure in an amount between 2 and 4 cubic feet per second for each square foot of bed surface.

5. Apparatus in accordance with claim 4 wherein each inlet opening has a size of approximately 30 square inches of area for each square foot of filter bed surface.

6. Apparatus in accordance with claim 4 wherein the height of each filter bed is approximately 20–25% of the height of its filter chamber.

7. A method of filtering dirty gas comprising filtering gas by passing the gas downwardly through a filter chamber containing a filter bed of granular material at the lower end thereof supported on a screen and wherein at least 60% of the space above the filter bed in said chamber is unoccupied, backwashing the filter bed for at least 5 seconds by fluidizing the granular material into said unoccupied space with a backwash gas flowing through valved conduit means including flow orifice means at uniform pressure and the amount of the backwash gas being 2 to 4 cubic feet per second square foot of filter bed surface.

8. A method in accordance with claim 7 wherein the height of the filter bed is between 1 and 3 inches and occupying not more than about 25% of the height of the filter chamber.

9. A method in accordance with claim 7 including supplying the backwash gas through the valved conduit containing the flow orifice means downstream from a pressure regulator valve to an outlet manifold chamber juxtaposed to a plurality of superimposed filter chambers.

10. A method in accordance with claim 7 including providing the filter chamber with an inlet adjacent the upper end of the chamber with the size of the inlet being 30 square inches for each square foot of the filter bed surface.

* * * * *